Patented Jan. 6, 1953

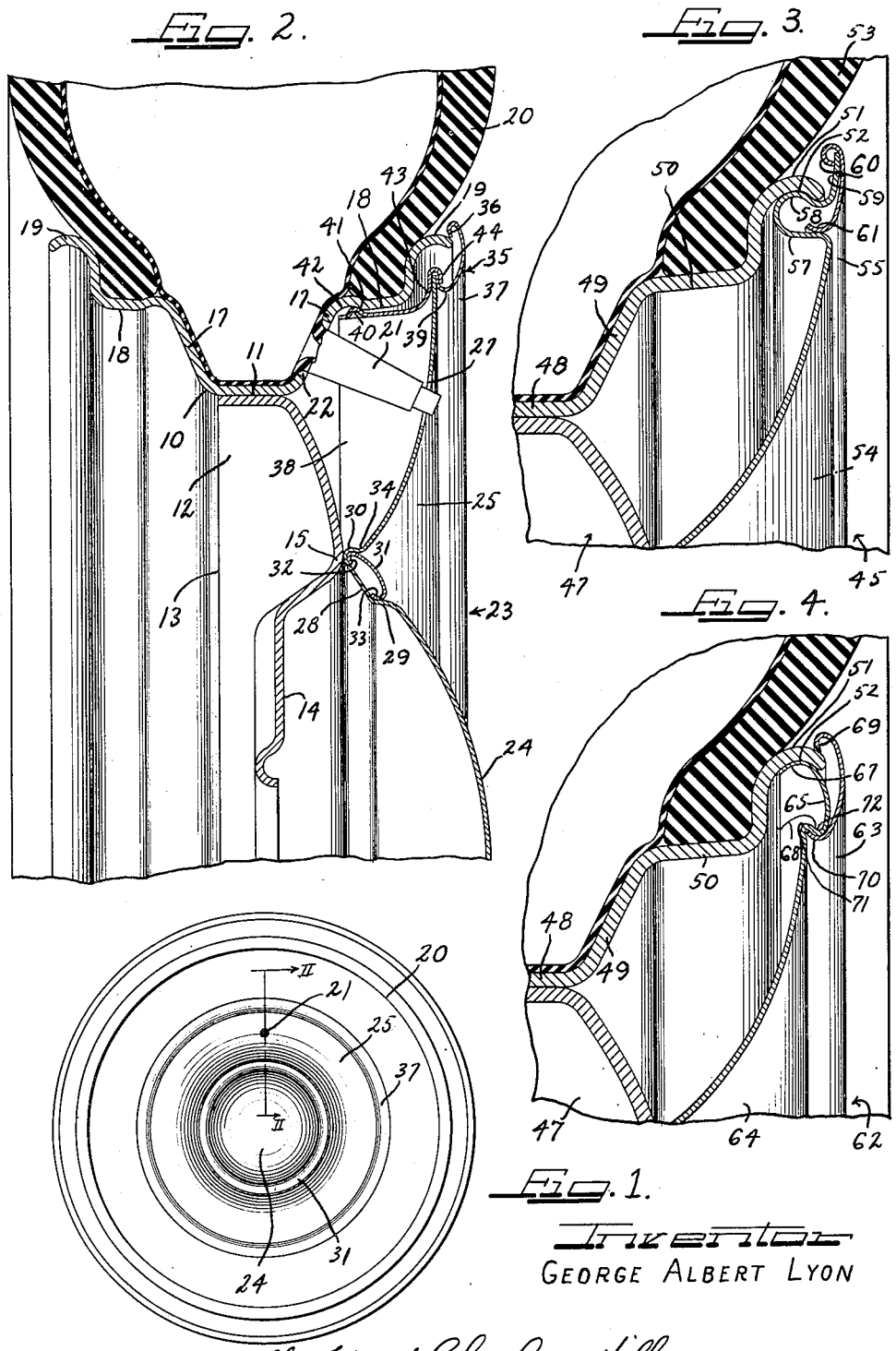

2,624,638

UNITED STATES PATENT OFFICE 2,624,638

WHEEL COVER

George Albert Lyon, Detroit, Mich.

Original application November 1, 1943, Serial No. 508,468, now Patent No. 2,443,626, dated June 22, 1948. Divided and this application November 20, 1947, Serial No. 787,105

12 Claims. (Cl. 301—37)

The present invention is directed to an improved wheel structure and relates more particularly to an improved wheel structure and cover assembly therefor.

The present application is a division of my application Serial No. 508,468, filed November 1, 1943, now Patent Number 2,443,626, issued June 22, 1948.

An important object of the present invention is to provide in a wheel structure an improved cover assembly and more particularly improved retaining means for maintaining the cover assembly over the outer side of the wheel.

Another object of the invention is to provide for a wheel structure a cover assembly adapted to be disposed over the outer side of the wheel and including cooperatively related circular members, the inner of which is formed from a locally flexible, temporarily, resiliently distortable material such as sheet synthetic plastic, or the like, whereby it is provided with characteristics enabling it to be self-sustaining and form retaining and yet resiliently deflectable in service.

It is a further object of the invention to provide for disposition over the outer side of a wheel structure, of a cover assembly including an outer annular cover portion, the outer part of which extends generally in the vicinity of the radially outer extremity of the tire rim, and circular retaining means for engaging with substantially the radially outer part of the cover and the tire rim over which the cover is disposed to attach the cover to the wheel structure.

Still another object of the invention is to provide for disposition over the outer side of a wheel, a circular cover structure having a radially outer portion arranged for detachable engagement with a portion of the wheel and having at the radially outer part thereof a circular ornamental bead member which serves as a strengthening and reinforcing medium and also serves as an ornamental border for the cover.

In accordance with the general features of the present invention there is provided for disposition over the outer side of a wheel structure having a tire rim and a central load bearing portion, a resiliently flexible circular cover having a margin terminating in the vicinity of the edge portion of the tire rim, said margin having a generally axially inwardly extending part retainingly engaging the tire rim, and including on said part a radially extending portion, and an annular reinforcing ornamental and concealing bead member having an underturned margin interlockingly engaging with said radial portion and extending generally radially in concealing relation to said radial portion and the tire rim edge.

According to other features of the invention, the marginal cover retaining part is in the form of a loop integral with the circular cover and engageable within a groove facing generally radially inwardly at the edge of the tire rim.

According to other general features of the invention there is provided in a wheel structure including a central load bearing portion and a flanged tire rim including opposite side wall flanges, opposite intermediate flanges and opposite edge portions, there being radially inwardly opening circular grooves provided in said opposite intermediate flanges in the vicinity of the junction thereof with the respective side wall flanges, and a cover assembly including a circular cover member arranged for disposition over the outer side of the wheel structure, said cover member having a generally axially inwardly extending flange arranged to extend across the radially inner surface of one of said intermediate flanges and having circularly disposed, circumferentially spaced radially outwardly extending bumps formed therein, said bumps being arranged to resiliently engage in said circular groove to retain the cover upon the wheel structure.

According to still further general features of the invention, there is provided in a wheel structure including a central load bearing portion and a tire rim having an edge portion extending generally axially outwardly and curved slightly radially inwardly, a cover assembly including a generally radially inwardly extending, circular portion cross-sectionally configurated to conform to the configuration of the radially inwardly facing groove defined by said edge portion of the tire rim and adapted for retaining, detachable nested engagement in said groove, said generally axially extending portion terminating in a radially outwardly extending flange and a bordering, rigidifying member for said cover assembly including a generally radially extending ring provided at the radially outer edge thereof with a turned back portion arranged to envelop and clampingly engage the radially outer margin of said radially outwardly extending flange of the cover.

Other objects, features and advantages of the present invention will be readily apparent from the following detailed description of certain preferred embodiments thereof taken in conjunction with the accompanying drawings in which:

Figure 1 is a side elevational view of a wheel and cover assembly according to the present invention;

Figure 2 is an enlarged fragmentary radial sectional view taken substantially on line II—II of Figure 1;

Figure 3 is a radial sectional view through a modified construction; and

Figure 4 is a radial sectional view through a further modified construction.

As shown on the drawings:

In the construction shown in Figures 1 and 2, the wheel assembly with which my invention is associated includes a tire rim 10 having a base flange 11 to which may be secured, as by welding, riveting or the like, an axially inwardly extending peripheral skirt 12 of a central load bearing portion 13. The central load bearing portion is further provided with a radial bolt-on flange 14 defined by an annular intermediate generally axially outwardly extending reinforcing nose bulge 15. To the bolt-on flange 14 may be secured in any suitable manner, as by bolts or the like, an appropriate portion of the vehicle such as a brake drum, axle, or the like (not shown).

The tire rim 10 is further provided with opposite side wall flanges 17, opposite intermediate generally axially outwardly extending flanges 18 and opposite edge portions or terminal, generally outwardly curved flanges 19. These various flanges cooperate to provide a drop center type of tire rim channel in which a suitable pneumatic tire and tube assembly 20 is adapted to be received, the tube having a valve stem 21 which projects outwardly through an appropriate aperture 22 in the side flange 17 at the outer side of the tire rim.

Ornamentally and protectively covering the outer side of the wheel, a cover assembly 23 is provided. This is of a character to be retained in engagement with the wheel by novel retaining means at the outer marginal portion of the assembly cooperative with the tire rim. To this end the cover assembly includes an inner circular cover member which preferably comprises concentric, integral central crown and trim ring portions 24 and 25, respectively, formed in one piece from suitable sheet material which may, if preferred, be sheet synthetic plastic having characteristics enabling it to be self-sustaining and form retaining and yet locally resiliently flexible. That is, either the crown portion 24 or the trim ring portion 25 may be indented or flexed manually or by an object bearing thereagainst, but it will spring axially outwardly immediately upon being relieved of the dstorting force. The trim ring portion 25 has an opening 27 therethrough for projection of the valve stem 21. Although the valve stem tip may barely protrude through the opening 27, the inherent resilient flexibility of the trim ring portion 25 permits the same to be pushed flexibly inwardly adjacent to the valve stem for additional access to the tip for the application of an air hose or the like for inflating the tire 20.

The crown portion 24 and the annular trim ring portion 25 are joined integrally in one piece divergently by a circular groove section 28 which, as shown in Figure 2, may extend on a frusto-conical taper generally radially outwardly and axially inwardly, merging with the crown portion 24 on a more axially disposed flange 29 and with the annular trim portion 25 on a curved circular junction part 30 which is so cross-sectionally configurated that it affords a generally radially inwardly opening annular groove in the outer face of the cover at the juncture. To the end that the cover may be reinforced at the juncture 28, a circular ring of relatively rigid material such as sheet metal is attached to the portion of the cover to be reinforced and ornamented. In the present instance this ring comprises a bead 31 having a generally convex cross-sectional formation and with the general plane of the body thereof extending parallel to the junction portion 28 and with the opposite edges thereof curled back thereunder as shown at 32 and 33, respectively. The reinforcing ring 31 is preferably formed with a radial dimension at the curled edge 32 slightly larger than the groove provided at the portion 30 and is snapped into the groove and held therein by the radially inwardly extending overhang or rib portion 34 at the axially outer side of the groove portion 30. The radially inner margin 33 of the bead or reinforcing ring 31 rests securely on the generally axially extending flange 29.

In assembly with the wheel, the axially inner extremity or rib 30 reinforced by the radially outer extremity 32 of the reinforcing bead or ring supportingly abuts the adjacent outer surface of the central load bearing part 13 of the wheel, and preferably at the nose bulge 15 thereof.

To the end that the radially outer margin of the cover member and particularly the trim ring annular portion 25 thereof will be thoroughly reinforced so that it may be detachably secured to the wheel, an improved outer marginal structure 35 is provided which includes an outer ornamental reinforcing portion 37 and an axially inner, concealed wheel engaging portion 38.

The outer reinforcing portion 37 is preferably in the form of a bead of generally arcuate cross-section formed on a relatively large radius and having a radial extent to lie at its inner margin in concealing, retained engagement with the outer margin of the trim ring portion 25 and with its outer margin overlying the outer edge of the tire rim, namely, the extremity flange 19 of the tire rim. The opposite margins of the bead member 37 are preferably turned under to afford a finished, reinforced construction therefor and provide an underturned marginal reinforcing flange 36 at the radially outer extremity of the bead and an underturned reinforcing flange 39 at the radially inner extremity of the bead.

In the present instance, the construction and relationship of the portions 37 and 38 is such that the inner retaining portion 38 engages the radially outer margin of the trim ring portion 25 of the cover and also secures the bead 37 to the cover assembly. To this end, the retaining portion 38 is in the form of a generally axially inwardly extending flange of a principal diameter slightly less than the diameter of the circle described by the inner face of the intermediate flange 18 of the tire rim, and of a length to extend to approximately the juncture of the intermediate flange 18 with the side flange 17, the retaining portion 38 having radially outwardly protruding retaining bumps 40 formed adjacent to the axially inner extremity thereof and engageable retainingly with a shoulder 41 provided at the axially outer side of a radially inwardly opening groove 42 formed adjacent to the juncture of the flanges 17 and 18 of the tire rim.

The portion 38 is preferably of generally L-shape in cross-sectional configuration and includes at its axially outer portion a generally radially extending flange portion 43 which is formed at its extremity with a return bent generally axially outwardly and radially inwardly extending turned back flange structure 44, arranged to envelop the radially outer edge of the trim ring portion 25 and the underturned inner marginal bead flange 39 and to interlock with the same to provide a unitary structure. Thereby the cover assembly is provided with a wheel engaging and retaining portion as well as a reinforcing and ornamental, concealing portion behind which the retaining portion 38 is effective, and the juncture of the portions of the assembly is concealed.

With the foregoing construction it will be seen that the cover parts 24, 25, the intermediate reinforcing and ornamenting annulus 31, the retaining annulus 38 and the protective annulus 37 are all secured together as a unitary structure and may be applied to and removed from the wheels as a unit. In applying the cover to the wheel, the portion 38 telescopes relative to the intermediate flange 18 of the tire rim until the radially outwardly extending bumps 40 engage the radially inner surface of the rim 18 and in the axially inward progress of the retaining flange portion 38 cause a radially inward distortion and compression of the flange annulus 38 about the bumps until they spring behind the shoulder 41 whereupon they return radially outwardly. It will be seen in this manner that a secure detachable engagement between the cover and the wheel is accomplished. In the event that the vehicle with which the wheel is associated is driven against curbing or the like, the ornamental, reinforcing and protective annulus 37 effectively protects the radially outer portion of the cover assembly against damage from abrasion or the like.

In the modified form of Figure 3, a cover structure 45, which possesses much the same attributes as the cover assembly 23, is constructed and arranged to be applied to the outer side of a wheel including a wheel body 47 and a tire rim 48. The tire rim comprises side flanges 49, intermediate flanges 50, and a terminal flange 51, the flanges at only the outer side of the tire rim being shown. The terminal flange 51 is of generally arcuate cross-section and affords a radially inwardly opening annular groove 52. A pneumatic tire and tube assembly 53 is supported within the channel defined by the tire rim 48.

The cover assembly 45 includes a circular cover member 54 which is formed from appropriate sheet material, such as synthetic plastic, similarly as the main cover member 24, 25 of the cover assembly 23, and it may be in the form of a disk having divergently related portions or it may be simply in the nature of an annulus providing merely a trim ring which will cover the tire rim 48 and at least the adjacent portion of the wheel body 47.

At its outer margin, the cover member 54 has a protective, ornamental and retaining structure which includes a relatively rigid, reinforcing bead or ring 55 and a generally axially inwardly extending flange formation 57 by which the cover is retained upon the wheel.

In the present instance, the retaining flange formation 57 is formed as an integral outer marginal part of the cover member 54 and is in the form of an inwardly directed loop-like rib having a radially outer side portion 58 which bulges radially outwardly annularly and interfits retainingly with the radially inwardly opening groove 52 of the tire rim marginal flange 51. The retaining portion 58 terminates in a generally radially outwardly extending flange 59 which extends radially outwardly beyond the tip of the terminal flange 51 and serves as a supporting medium for the reinforcing ring member 55.

The ring 55 may be formed from steel and provided with an ornamental finish comprising either a high polish or enamel on the outer surface thereof. The ring 55 is provided with a radially outer marginal underturned reinforcing and retaining bead 60 which is arranged to envelop and interlock around the radially outer edge of the flange 59 of the inner cover member. With this construction, it will be seen that the cover member 54 and the ring 55 are secured together as a unitary structure, and this may be accomplished by a suitable rolling operation which is accomplished prior to application of the cover to the outer side of the wheel.

From the bead 60 the ring 55 extends radially inwardly and has at its radially inner margin a rearwardly or axially inwardly turned marginal flange 61 which is adapted to enter into the mouth of the annular axially outwardly opening groove provided by the looped retaining flange structure 57, and with the flange 61 abutting the axially outer portion of the radially inner side of the groove, or rather the radially outer side of the radially inner wall defining the groove. The bead 55 is, of course, radially convex in its outer visible formation.

Through this arrangement, the outer bead 55 is floatingly mounted so that upon accidental deflation of the tire, or lateral expansion thereof, the ring 55 with the adjacent portion 59 of the main cover member will yield resiliently, radially inwardly upon the application of radial inward pressure thereagainst. The rounded abutment of the inner flange 61 of the bead 55 against the wall of the rib 57 assists in this action.

To apply the cover assembly 45 to the wheel, all that need be done is to dispose the same concentric with the wheel and with the looped retaining flange 57 in contact with the tip of the tire rim flange 51, and then apply axially inward pressure and the loop 57 will yield and snap into the groove 52, the outwardly bulged annular portion 58 of the loop maintaining a yieldable but effective hold upon the tire rim.

To remove the cover assembly 45 from the wheel, the application of axially outward pressure against the bead 60 of the reinforcing ring will cause the rib portion 58 to cam out of engagement with the tire rim terminal flange 51 and release the cover.

In the modification of Figure 4, the wheel is the same as in the form of Figure 3 and therefore similar reference numerals are applied to the wheel. In this form, however, a cover assembly 62 is provided in which an outer ornamental and reinforcing bead or ring 63 cooperates in a slightly different fashion with an inner circular main cover member 64 which has a radially outer marginal retaining structure 65 of slightly different form. The cover member 64 may be constructed from sheet synthetic plastic material similarly as the main cover portions of the other forms of cover heretofore described.

In the form of Figure 4, the retaining outer marginal structure 65 is in the form of an outward looped rib including a generally axially inwardly, curvate terminal portion or flange 67 of a cross-sectional configuration whereby it rests in nested retaining engagement in the radially inwardly opening groove 52 of the tire rim marginal flange 51. By reason of the resilient deflectability of the material of the curled retaining rib portion 65, the arcuate retaining flange 65 is adapted to curl in upon itself as an incident to camming past the tip of the tire rim flange 51 upon inward axial pressure in applying the cover to the wheel and then uncurls snappingly into the groove 52. If desired, the flange 67 may be slit at intervals, as indicated at 68, in order to provide a plurality of fingers to facilitate the curling, manipulation thereof into and out of engagement with the tire rim terminal flange 51.

The ornamental and protective ring or bead 63 is of a radial extent to lie in concealing relation to the terminal flange 51 of the tire rim and also to lie in concealing relation to the retaining, looped outer marginal portion 65 of the cover member 64. At its outer margin, the ring 63 is formed with an underturned reinforcing and finishing bead 69 which is adapted to engage against the radially outer side of the tire rim terminal flange 51. At its inner margin, the ring 63 is formed with an underturned generally axially inwardly and radially outwardly extending flange 70. At the radially inner side of the retaining rib 65, the cover member 64 is formed with a circular, radially outwardly reentrant formed portion 71 which affords a radially inwardly opening groove for interlockingly receiving the radially inner peripheral edge flange 70 of the ring member 63. In effecting assembly of the ring 63 the cover member 64, the radially inner edge flange 70 of the ring is interlocked within the retaining groove at the portion 71, the axially outer side of the groove, which is defined by a generally radially inwardly extending annular rib 72 being resiliently flexibly distortable to pass the marginal flange 70 into the groove and then snaps into the generally radially outwardly opening groove defined by the marginal flange 70 of the ring. This provides a unitary assembly for the cover structure. Assembly of the cover with the wheel is effected simply by pressing it axially inwardly against the wheel after disposing the cover concentric with the wheel. Removal of the cover is effected easily by applying a pry-off tool behind the outer margin of the ring 63 or merely by pulling axially outwardly thereon.

In the assembled relation of the cover with the wheel, the ornamental, protective ring 63, which may be finished in any desired manner as by polished lustrous surface or with any preferred colored enamel, and serves as a reinforcing, rigidifying instrumentality and as a border for the cover. When the vehicle with which the wheel is associated is driven with force against a curbing or the like, the ring 63 upon engagement with the curbing will tend to flex axially inwardly and to a degree, pivot locally about the edge of the flange 69 so that the radially inner part thereof will swing slightly inwardly and carry the adjacent portion of the cover member 64 therewith. Under such circumstances it will be apparent that the assembly is, in a sense, free floating and will thus protect the radially outer margin of the cover against damage.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. For disposition over the outer side of a wheel structure having a tire rim and a central load bearing portion, a resiliently flexible circular cover having a margin adapted to be disposed adjacent to the edge portion of the tire rim, said margin having a generally axially inwardly extending part retainingly engageable with the tire rim, and including on said part a radially extending portion, and an annular reinforcing ornamental and concealing bead member having an underturned margin interlockingly engaging with said radial portion and extending generally radially in concealing relation to said radial portion.

2. For disposition over the outer side of a wheel structure having a tire rim and a central load bearing portion, a resiliently flexible circular cover having a margin adapted to be disposed adjacent to the edge portion of the tire rim, said margin having a generally axially inwardly extending part retainingly engageable with the tire rim, and including on said part a radially extending portion, and an annular reinforcing ornamental and concealing bead member having an underturned margin interlockingly engaging with said radial portion and extending generally radially in concealing relation to said radial portion, said marginal cover retaining part being in the form of a loop integral with the circular cover and engageable within a groove facing generally radially inwardly at the edge of the tire rim.

3. In a wheel structure including a central load bearing portion and a tire rim having an edge portion extending generally axially outwardly and curved slightly radially inwardly, a cover assembly including a generally radially inwardly extending, circular portion cross-sectionally configurated to conform to the configuration of the radially inwardly facing groove defined by said edge portion of the tire rim and adapted for retaining, detachable nested engagement in said groove, said generally axially extending portion terminating in a radially outwardly extending flange, and a bordering, rigidifying member for said cover assembly including a generally radially extending ring provided at the radially outer edge thereof with a turned back portion arranged to envelop and clampingly engage the radially outer margin of said radially outwardly extending flange of the cover.

4. In a wheel structure having a central load bearing portion and a tire rim provided with opposite side wall flanges, opposite, generally axially extending intermediate flanges, and opposite edge portions, there being a circular groove formed in at least one of said intermediate flanges in the vicinity of the junction thereof with the respective side wall flange, a cover assembly including a circular cover member, said cover member having a radially outer portion arranged to extend radially outwardly beyond the junction of the load bearing portion of the wheel with said tire rim and a circular retaining member having a cross-sectional configuration including a generally axially inwardly extending portion and a generally radially outwardly extending portion, said axially inwardly extending portion including protuberant means for resiliently engaging in the groove in the respective intermediate flange of the tire rim, said radially outwardly extending portion terminating in a bent back flange arranged to envelop and clampingly engage the radially outer margin of the cover member, whereby the cover member may be detachably secured to the wheel structure by said retaining means.

5. In a wheel structure having a central load bearing portion and a tire rim provided with opposite side wall flanges, opposite, generally axially extending intermediate flanges and opposite edge portions, there being a circular groove formed in at least one of said intermediate flanges in the vicinity of the junction thereof with the respective side wall flange, a cover assembly including a circular cover member, said cover member having a radially outer portion arranged to extend radially outwardly beyond the junction of the load bearing portion of the wheel with said tire rim and a circular retaining member having a cross-sectional configuration including a generally axially inwardly extending portion and a generally radially outwardly extending portion, said axially inwardly extending portion including protuberant means for resiliently engaging in the groove in the respective intermediate flange of the tire rim, said radially outwardly extending portion terminating in a bent back flange arranged to envelop and clampingly engage the radially outer margin of the cover member, whereby the cover member may be detachably secured to the wheel structure by said retaining means, and a bordering member for said cover assembly including an annulus having a generally radially extending portion arranged to extend radially outwardly from the radially outer extremity of the cover member, said bordering member having a radially inner margin bent back upon itself and arranged to be disposed in surface engagement with the radially outer part of the cover to be enveloped by and clampingly engaged by the turned back portion of the radially extending part of the retaining member.

6. In a cover assembly of the character described, a central cover member having a radially outwardly extending edge, a retaining ring having a portion encompassing said edge, and a protective and ornamental bordering annulus having a portion thereof engaged by and secured to said cover edge by said encompassing portion of the retaining ring.

7. In a vehicle wheel cover assembly, an inner cover member having a radially outer portion thereof including a generally axially inwardly extending retaining flange structure and a radially extending part, said retaining flange structure being bulged radially outwardly for sliding face-to-face snap-on, pry-off retaining engagement with a shoulder structure on a wheel, and a protective outer annular ring member of generally convex cross-section overlying said part and having an underturned marginal structure interlockingly engaged with said part.

8. In a cover assembly of the character described, an inner cover member having a radial expanse to extend in substantial concealing relation to a tire rim and at least the adjacent portion of a load sustaining body part associated with the tire rim of a wheel, the outer margin of said cover member being adapted to extend into proximity to the terminal flange of the tire rim, a protective and ornamental ring member of generally convex cross-section and of a radial expanse to lie in concealing relation to the tire rim terminal flange and having an inner underturned generally radially outwardly extending flange, and a generally radially inwardly extending part at the outer margin of said inner cover member and on the axially outer side thereof and interlockingly engaging with said underturned inner marginal flange of the ring member.

9. In a cover assembly of the character described, an inner cover member having a radial expanse to extend in substantial concealing relation to a tire rim and at least the adjacent portion of a load sustaining body part associated with the tire rim of a wheel, the outer margin of said cover member being adapted to extend into proximity to the terminal flange of the tire rim, a protective and ornamental ring member of generally convex cross-section and of a radial expanse to lie in concealing relation to the tire rim terminal flange and having an inner underturned generally radially outwardly extending flange, and a generally radially inwardly extending part at the outer margin of said inner cover member and on the axially outer side thereof and interlockingly engaging with said underturned inner marginal flange of the ring member, said interlocking part including a portion behind said ring and the juncture of the ring with the cover member and projecting generally axially for retaining engagement with the tire rim to hold the cover on the wheel.

10. In combination in a cover for disposition at the outer side of a vehicle wheel including a multi-flange tire rim, a circular wheel cover member of a magnitude and extent to substantially cover the tire rim and adjacent portion of the wheel body, means at the outer margin of the cover member extending generally axially inwardly and constructed and arranged to engage retainingly with a flange of the tire rim for retaining the cover on the wheel, and a bead concealing said retaining means and having an underturned marginal flange, said retaining means including a portion interlockingly engaged with said underturned flange to retain the bead in assembly with the outer margin of the cover member.

11. In combination in a wheel cover of the character described, a circular wheel cover member adapted to be disposed at the outer side of a vehicle wheel and being of a diameter to extend over the outer side of the tire rim of the wheel, means at the outer margin of the cover member including a generally axially inwardly extending portion arranged to effect cover retaining inter-engagement with a flange of the tire rim and a generally radially extending portion, and an ornamental and protective annular bead member concealing said retaining means and having an underturned flange interlocked behind said radially extending portion for retaining the bead in assembly with the cover member.

12. In a structure for a wheel including a central load bearing portion and a flanged tire rim including base, side, intermediate, and terminal flanges, with the intermediate flange extending generally axially outwardly and having a generally radially inwardly opening annular groove at the base thereof defining a generally radially and axially inwardly facing shoulder at the axially outer side thereof; a cover for the outer side of the wheel comprising a circular body member of a magnitude and extent to substantially cover the tire rim and to extend radially inwardly into concealing relation to the load bearing portion, said body member having at the outer margin thereof an axially inwardly extending annular continuous retaining flange of a diameter slightly less than the inner diameter of said intermediate flange of the tire rim and of a width to extend from axially outwardly of the intermediate flange, so that the margin of said body can overlie the tire rim terminal flange, to an axially inner edge lying axially inwardly from said groove shoulder, the inner terminal portion of said retaining flange having an annular series of retaining bumps solid in one piece therewith and projecting as nodes radially outwardly to a diameter greater than the inner diameter of said tire rim intermediate flange, said retaining flange being resilient whereby to enable said bumps to be cammed along and past said tire rim intermediate flange by pressing the cover axially inwardly until said retaining bumps snap into retaining engagement behind said shoulder for retaining the cover on the wheel, said bumps maintaining said retaining flange in uniformly spaced relation to said intermediate flange so as to afford a radially limited floating relationship of the cover to the wheel to facilitate pry-off of the cover by limited radial yielding of said retaining flange to ease release of certain of the retaining bumps adjacent to application of pry-off tool force to the cover in removing the cover from the wheel.

GEORGE ALBERT LYON.

REFERENCES CITED

The following references are of record in the file of this patent:

UNITED STATES PATENTS

| Number | Name | Date |
| --- | --- | --- |
| Re. 22,042 | Lyon | Mar. 3, 1942 |
| 2,011,326 | Sinclair | Aug. 13, 1935 |
| 2,016,395 | Sinclair | Oct. 8, 1935 |
| 2,123,025 | Ramirez | July 5, 1938 |
| 2,135,757 | Lyon | Nov. 8, 1938 |
| 2,443,626 | Lyon | June 22, 1948 |